UNITED STATES PATENT OFFICE.

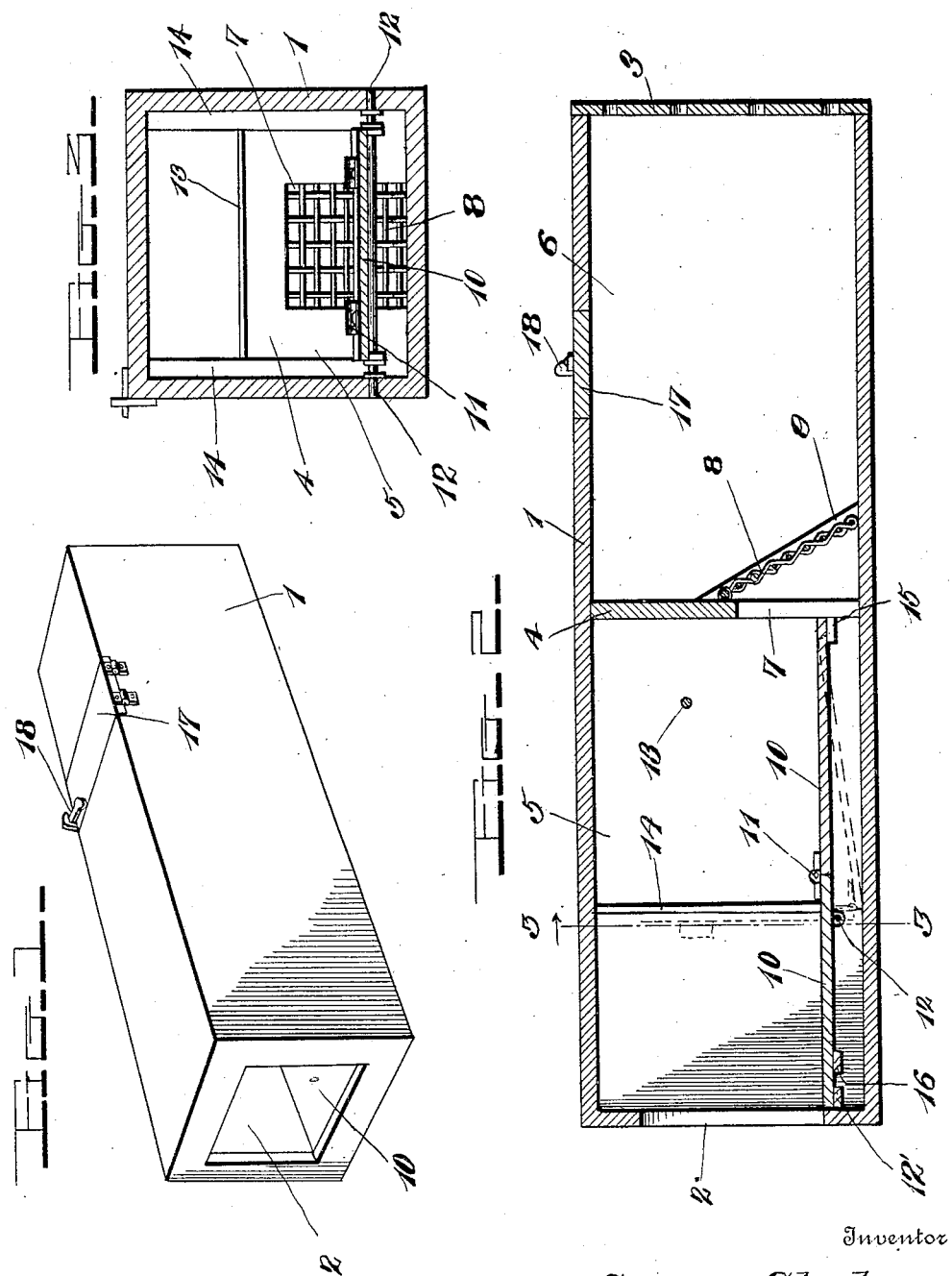

SEYMORE STANBERRY, OF GREENUP, ILLINOIS.

ANIMAL-TRAP.

1,054,050.  Specification of Letters Patent.  Patented Feb. 25, 1913.

Application filed January 13, 1912. Serial No. 671,033.

*To all whom it may concern:*

Be it known that I, SEYMORE STANBERRY, a citizen of the United States, residing at Greenup, in the county of Cumberland and State of Illinois, have invented certain new and useful Improvements in Animal-Traps, of which the following is a specification, reference being had to the accompanying drawings.

My invention relates to new and useful improvements in animal traps and more particularly to a trap, into which one or more animals may be lured and retained therein alive until released or otherwise disposed of by the operator, and my object is to provide a trap of this character which is continuous or self setting.

A further object of the invention resides in providing a trap which does not depend upon springs, catches or the like for the retention of the animal, whereby it will be appreciated that valuable animals may be trapped alive without the slightest harm occurring to the same in any respect, whatsoever.

A still further object resides in providing a device which is simple and durable in construction, inexpensive to manufacture, and one which is very efficient and useful in operation.

With these and other objects in view, my invention consists in the novel features of construction, combination and arrangement of parts as will be hereinafter referred to and more particularly pointed out in the specification and claims.

In the accompanying drawing forming a part of this application, Figure 1 is a perspective view of the device. Fig. 2 is a longitudinal section therethrough showing the device set up for operation and showing in dotted lines the position of the treadle when the weight of an animal is effectively placed thereon, and, Fig. 3 is a transverse section as seen on line 3—3, Fig. 2.

In carrying out my invention, I shall refer to the drawing in which similar reference characters designate corresponding parts throughout the several views and in which 1 indicates a housing of any desired size and shape, I having shown the same, for convenience, rectangular in design, the one end wall of which is provided with a reduced opening 2, while the opposite end or rear wall 3 is perforated. The housing 1 is provided therewithin about centrally with a partition 4 which divides the housing into two compartments 5 and 6, respectively, and the lower portion of said partition 4 is provided with an opening 7 which permits communication between the two compartments, said opening being covered by a wire door or the like 8 which is hinged at its upper end to the partition and held normally in its lowered position, the lower end of said door contacting with the floor of the housing rearwardly of the door-way 7 to dispose said door at an angle to the partition 4. Extending from one face of the partition 4 on opposite sides of the opening therein are the projecting faces 9 between which said door swings, the side edges of said door being adapted to abut the inner opposed faces of the projecting walls or faces 9. From this construction it will be appreciated that an animal entering the compartment 5 through the entrance opening 2, may enter the compartment 6 by merely forcing the door 8 inwardly, but after having once entered the compartment 6, said animal will be unable to make its exit therefrom, in view of its inability to raise the door 8.

A treadle 10 which is formed in sections hinged one to the other, as shown at 11, has the outer section thereof pivoted, adjacent its hinged end, to the side walls of the compartment 5, as shown at 12. The forward end of the pivoted section of the treadle is adapted to rest on a ledge or the like 12' formed on the lower wall of the opening 2 of the housing so that an animal entering said opening may readily step upon the section, while the free or rear end of the rear section of said treadle rests normally upon a stop or the like 15 on the partition 4, thereby positioning the two sections in horizontal alinement above the floor of the housing.

A rod or the like 13 extends transversely of the housing and is mounted in the side walls of the compartment 5 upon which may be hung or engaged in any manner, the bait for the animal, and as the animal, attracted by said bait, enters the opening 2, he will immediately step upon the treadle 10. Upon continuing on the treadle in an endeavor to reach the bait, the animal will pass to the rear or freely disposed section of the treadle, whereupon the weight of the animal will cause this last mentioned section to drop downwardly at the hinged end thereof, thereby swinging the pivotal section on its pivot point and substantially closing the passage-way. In order to limit the movement of the pivotal section of the treadle as the free end rises upwardly and to prevent light from the opening 2 entering the inclosure beyond the raised section of the treadle, I provide the stop member or strips 14 on the side walls of the compartment 5.

From the above construction, it will be seen that when an animal has entered the device and has caused the pivotal section of the treadle to swing so as to close the passage-way and prevent the return of the animal through the opening 8, said animal will naturally pass through the opening 7 to the compartment 6, the light entering said compartment through the perforations in the wall 3, causing a slight attraction thereto. As soon as the animal leaves the freely disposed section of the treadle, the pivotal section thereof will return to its initial position by gravity, but in order to make this return positive, a slightly weighted member 16 is provided on the under face thereof. When an animal has left the treadle and entered the compartment 6, it will be seen that the gate or door 8 will return to its closed position and thereby prevent the animal from making his exit through the opening 7, due to the animal's inability to raise said door 8, and, of course, the treadle having returned to its initial position, will be set for another animal to enter which may be allured by the bait in the trap. In order for the owner of the trap to remove any animals therefrom which have been retained therein, the top of the housing over the compartment 6 is provided with a hinged door 17 which may be held normally in its closed position by means of a hook or latch member 18.

From the foregoing, it will be seen that I have provided an improved self-setting trap wherein animals may be allured therein alive without any harm occurring thereto, whatsoever. It will further be seen that in accomplishing this result, I provide a sectional treadle, the sections of which are hinged one to the other and one section of said treadle being pivotally mounted in the walls of the trap, whereby when a weight is disposed on the freely disposed section, the pivotal section will swing on its pivots and substantially close the passage-way.

It will still further be seen that my device is extremely simple and durable in construction, inexpensive to manufacture, and is one which is very efficient and useful in operation.

While I have particularly described the features of the invention which are best adapted to perform the functions set forth, it is obvious that various changes in form, proportion and in the minor details of construction may be resorted to without departing from the spirit or sacrificing any of the principles of the invention.

What I claim is:—

1. An animal trap of the class described comprising an open-ended housing, the rear wall of which is closed and provided with air and light openings, a partition wall in said housing dividing the same into a pair of compartments, said wall being provided with an opening to allow communication between said compartments, a door hinged at its upper end to the one face of said partition over the opening therein, a sectional treadle mounted in the forward compartment of the housing, the sections of which are hinged one to the other on their upper faces and foldable upwardly, means to pivotally mount the forward section adjacent its hinged end to the side walls of the forward compartment, a ledge secured to the inner face of the front wall of the housing immediately below the opening therein, said ledge being adapted to receive thereon the free end of the pivoted section, an additional ledge secured to the outer face of the partition wall to receive thereon the free end of the rear section of the treadle, the sections of said treadle being disposed in horizontal alinement when resting on said ledges, and strips secured to the side walls of the outer compartment to limit the upward swinging movement of the outer section of the treadle when a weight is placed on the rear section thereof.

2. An animal trap comprising a housing having a pair of communicating compartments therein and provided with an opening in the front wall thereof, a sectional treadle mounted in the forward compartment of said housing, the sections thereof being hinged one to the other on their upper faces and foldable upwardly, means to pivotally mount the forward section of the treadle adjacent the hinged end thereof to the side walls of the forward compartment, a ledge secured to the inner face of the front wall of said housing immediately below the opening therein, said ledge being adapted to receive thereon the free end of the forward section of said treadle, additional means carried within the housing to receive the free end of the rear section of the treadle thereon, the sections of said treadle in normal position being arranged in horizontal alinement and disposed flush with the lower edge of the opening in the front wall of said housing, and strips carried on the inner faces of the side walls of the forward compartment to limit the upward swinging movement of the forward section of said treadle when a weight is placed on the rear section thereof.

In testimony whereof I hereunto affix my signature in the presence of two witnesses.

SEYMORE STANBERRY.

Witnesses:
 MARION STANBERRY,
 J. W. HOLT.

Copies of this patent may be obtained for five cents each, by addressing the "Commissioner of Patents, Washington, D. C."